United States Patent [19]

Branham et al.

[11] 4,053,036

[45] Oct. 11, 1977

[54] WHEEL BRAKE ASSEMBLY

[75] Inventors: William C. Branham, Minnetonka; Venkat R. Garlapaty, Brooklyn Center; David W. Berg, Minneapolis, all of Minn.

[73] Assignee: Tol-O-Matic, Inc., Minneapolis, Minn.

[21] Appl. No.: 607,294

[22] Filed: Aug. 25, 1975

[51] Int. Cl.² .......................................... F16D 67/02
[52] U.S. Cl. ............................ 192/13 R; 188/70 R; 188/18 A; 401/1
[58] Field of Search ............... 180/19 R; 188/69, 170, 188/70 R, 18 A; 192/13 R, 13 A, 14, 64, 66, 67 R, 67 P, 9; 301/6 R, 6 D, 6 E, 6 WB, 5 R, 12 R, 12 H, 125, 1, 112, 113, 108 R, 108 S; 403/1

[56] References Cited

U.S. PATENT DOCUMENTS

| 232,926 | 10/1880 | Betkholz | 403/1 |
|---|---|---|---|
| 2,844,238 | 7/1958 | Peterson | 403/1 |
| 2,948,557 | 8/1960 | Howe | 192/67 R |
| 3,251,630 | 5/1966 | Astley | 301/1 |
| 3,527,314 | 9/1970 | Mistarz | 180/19 R |
| 3,586,136 | 6/1971 | Kamman | 188/170 |
| 3,647,030 | 3/1972 | Burnett | 188/170 |
| 3,669,476 | 6/1972 | Wilson | 192/67 R |
| 3,863,038 | 1/1975 | Kreitmer et al. | 188/170 |

Primary Examiner—Robert B. Reeves
Assistant Examiner—H. Grant Skaggs
Attorney, Agent, or Firm—Dorsey, Windhorst, Hannaford, Whitney & Halladay

[57] ABSTRACT

A combination wheel brake assembly for connection with a wheel or other rotatable element comprising a rotatable axle, a spring applied, hydraulically released brake assembly, a wheel hub rotatably supported on the axle and adapted for connection with the wheel and free wheeling hub mechanism for selectively rendering the wheel hub free wheeling to permit the wheel to be freely rotated despite a loss or failure of hydraulic pressure and despite braking engagement of the braking elements.

12 Claims, 3 Drawing Figures

WHEEL BRAKE ASSEMBLY

BACKGROUND OF THE INVENTION

The present invention relates generally to a combination wheel brake assembly, and more particularly, to a combination brake and wheel hub assembly having a spring applied, hydraulically released brake assembly and improved means for selectively allowing the wheel hub to be freely rotated despite the application of the spring applied brake and loss of hydraulic pressure in the system.

Hydraulically actuated braking systems in many vehicles and other apparatus require a fail-safe braking system which is spring applied and hydraulically released so that it is actuated and applied whenever there is a loss of hydraulic fluid in the system. If no such fail-safe system were present, a loss of hydraulic pressure would normally result in the failure of the braking system. However, with a spring applied, hydraulically released fail-safe brake, the spring applied brake would automatically be actuated upon a failure or loss of hydraulic pressure or if the hydraulic pressure was insufficient to release the brake.

One problem which is created by utilizing a fail-safe brake system such as that described above is the lack of mobility of the vehicle when the fail-safe system is actuated. Because there is no hydraulic or other pressure available to release the spring applied brake, the vehicle is locked in a braked position unless the braking effect of the spring applied brake can be overcome. In the prior art, this was usually accomplished by manually and mechanically releasing the braking pressure applied by the fail-safe brake spring by separating the braking surfaces.

SUMMARY OF THE INVENTION

The principal object of the present invention is to provide a spring applied, hydraulically released wheel brake assembly which has a improved and unique means for rendering the vehicle or apparatus mobile in the event of a loss of hydraulic pressure and actuation of the fail-safe brake.

Specifically, the structure of the assembly of the present invention includes a cylinder housing which is secured to the frame of the vehicle or other apparatus with which the assembly is used. Rotatably mounted within the cylinder housing is an axle which is driven by a conventional hydraulic or other motor and upon which is rotatably mounted a rotatable braking element comprising a portion of a spring applied, hydraulically released fail-safe brake system. A wheel hub to which the wheel or other rotatable element desired to be braked is mounted and a means for rendering the wheel or other apparatus mobile in the event of a loss of hydraulic fluid is also mounted on such axle. In the prior art, the wheel was rendered mobile or rotatable in such a situation by manually and mechanically releasing the brake. In the present invention, however, providing the vehicle with mobility in the event of a loss of hydraulic pressure is accomplished by enabling the wheel hub to become free wheeling or freely rotatable, even though the spring applied brake is still actuated. Specifically, even though the braking elements are still engaged, but the driving connection between the wheel hub and the rotatable axle has been selectively disengaged, thereby permitting the wheel hub, and thus the wheel, to freely rotate.

Accordingly, it is a primary object of the present invention to provide a spring applied, hydraulically released wheel brake assembly with improved means for rendering the vehicle or apparatus mobile in the event of a loss of hydraulic pressure.

A further object of the present invention is to provide a wheel brake assembly having in combination, a spring applied, hydraulically released brake, a rotatable wheel hub and a means for selectively engaging the wheel hub with a rotatable axle and brake element.

Another object of the present invention is to provide a combination wheel brake assembly with a spring applied, hydraulically released brake having means for rendering the wheel hub freely rotatable in the event of a loss of hydraulic fluid to the brake assembly.

A further object of the present invention is to provide a wheel brake assembly having means for selectively engaging and disengaging the driving force to the wheel hub, which means is effective to render such wheel hub freely rotatable in the event of a loss of hydraulic pressure.

These and other objects of the present invention will become apparent with reference to the drawings, the description of the preferred embodiment and the appended claims.

DESCRIPTION OF THE DRAWINGS

FIG. 2 shows the braking elements in an disengaged position and the wheel and free wheel hubs in an engaged position.

DESCRIPTION OF THE PREFERRED EMBODIMENT

Figure 1:
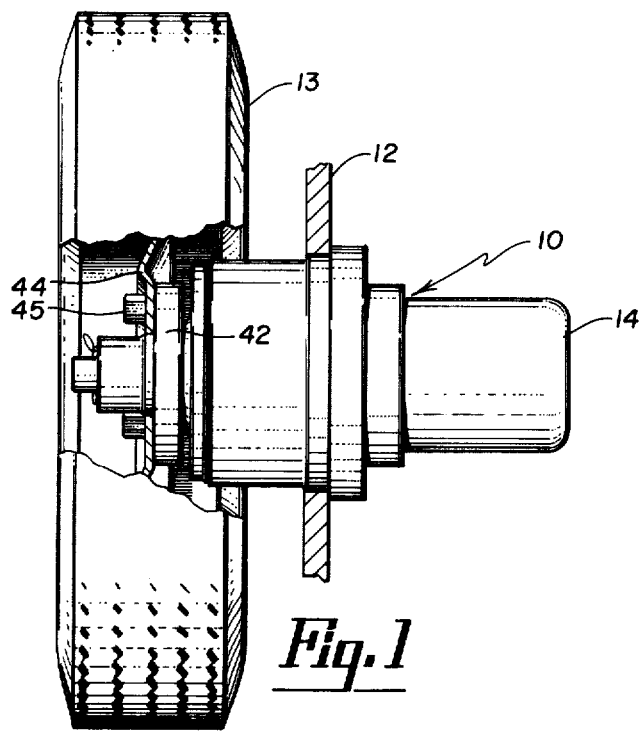
FIG. 1 is an elevated, partially cut-away view showing the wheel brake assembly of the present invention as connected to the wheel of a vehicle.

With respect to FIG. 1, the wheel brake assembly 10 of the present invention is shown as it is intended to be mounted on a wheel supported vehicle. The assembly 10 is generally cylindrical in shape and includes appropriate means for connection to the frame 12 of a vehicle. A wheel 13 is connected to the assembly 10 via a plurality of threaded bolts 45 which extend through the wheel rim 44 and into the wheel hub 42 which comprises a portion of the assembly 10. Although the assembly of the present invention is shown as being mounted to a vehicle for connection to a wheel, it is contemplated that such assembly may be used with rotatable elements other than a wheel of a vehicle; thus, when it is stated that the present assembly is usable with a wheel, the term "wheel" is intended to include such other rotatable elements.

Figure 2:
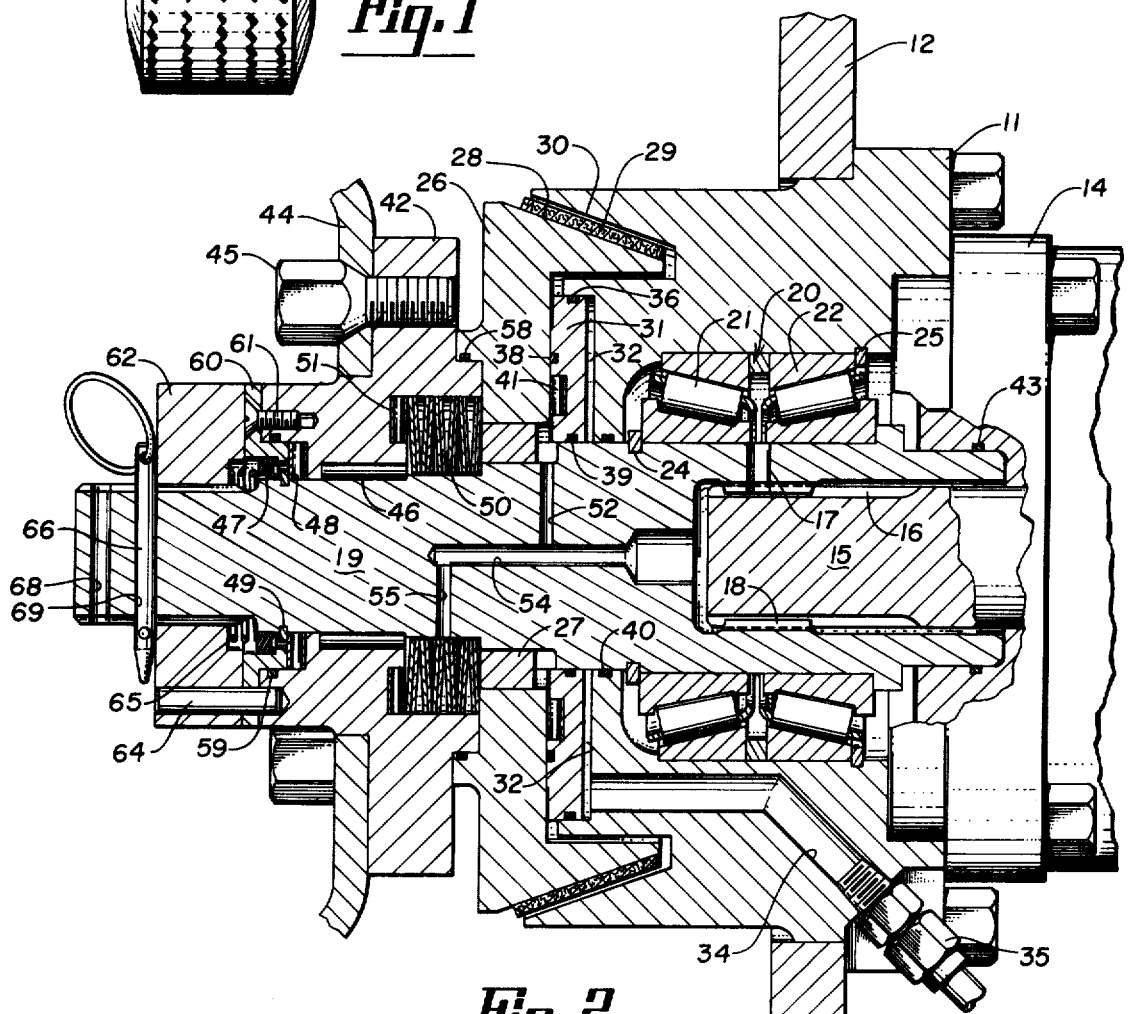
FIG. 2 is an elevated, cut-away sectional view of the wheel brake assembly of the present invention cut along the longitudinal axis of such assembly.
Figure 3:
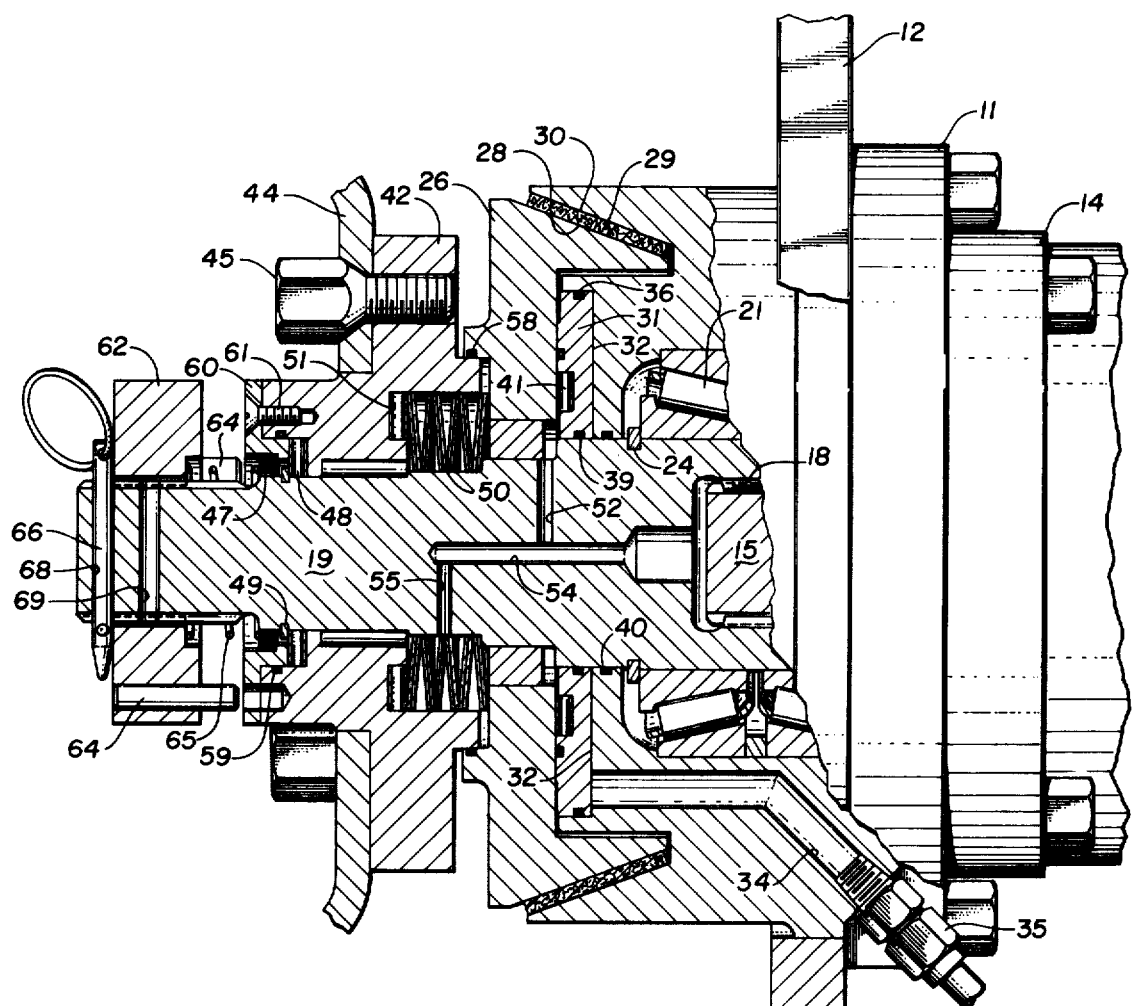
FIG. 3 is a view similar to that of FIG. 2 showing the braking elements in an engaged position and the wheel and free wheel hubs in a disengaged position.

Reference is next made to FIG. 2 which is an elevated, cut-away view of the wheel brake assembly of the present invention as cut through the longitudinal axis of such assembly. In FIG. 2, the wheel brake assembly 10 includes a brake cylinder housing 11 which is adapted for mounting to a portion of the vehicle or apparatus frame 12 by appropriate connection means (not shown). In the preferred embodiment, the cylinder housing 11, and thus the assembly 10, is rigidly secured to the vehicle frame 12 to prevent any relative movement between such elements. Mounted on the inner or right hand side of the housing 11 as viewed in FIGS. 2 and 3 is a conventional hydraulic or other type of motor 14 which provides the driving force to the wheel assembly. A typical hydraulic motor which can be satisfactorily used in the present invention is a Model 4000 Charlynn bearingless motor. The motor 14 in the preferred embodiment is driven by an appropriate source of hydraulic fluid pressure (not shown). The motor 14 has a shaft 15 which extends into the cylinder housing 11 and which includes a plurality of external splines 16 positioned about its periphery to engage corresponding internal splines 18 of the brake wheel assembly shaft or axle 19.

The shaft or axle 19 is rotatably supported within the stationary housing 11 by a main roller bearing assembly 20 and extends throughout the entire length of the wheel brake assembly. As illustrated specifically, the axle 19 is rotatably mounted within the housing 11 by the bearing assembly 20 which includes a plurality of bearing rollers 21 and associated races 22. The bearing assembly 20 is retained in proper functional relationship with the axle 19 and the housing 11 by a pair of snap ring retainers 24 and 25. A lubrication passage 17 is provided in the axle 19 and extends radially through a portion of the axle 19 into communication with the chamber housing the bearing assembly 20. The passage 17 enables low pressure fluid or lubrication which may leak from the motor 14 or be provided externally to lubricate the bearing assembly 20. Appropriate O-ring seals 40 and 43 are disposed on either side of the chamber housing the bearing assembly 20.

Disposed immediately to the left of the brake cylinder housing 11 as viewed in FIGS. 2 and 3 is a rotatable, metal cone-shaped brake element 26 which, together with a portion of the brake cylinder housing 11, form the braking assembly of the present invention. The rotatable brake element 26 is supported by the axle 19 for rotation therewith and is adapted for limited longitudinal movement relative to the axle 19. In the present embodiment, the element 26 includes internal splines or a key arrangement 27 associated with appropriate corresponding members on the axle 19 to permit the limited movement of the element 26 longitudinally along the axle 19. Such splines or keys 27 also cause the brake element 26 to rotate with the axle 19. The braking portion of the rotatable brake element 26 comprises an exterior, cone-shaped surface 28 which converges toward the right as viewed in FIGS. 2 and 3. A friction lining 29 of suitable material is secured to the surface 28 and is adapted for movement toward, and for frictional engagement with, a corresponding internal cone-shaped surface 30 of the brake cylinder housing 11. The friction lining 29 and the surface 30 are constructed of materials which will result in braking the rotational movement of the element 26 and thus the axle 19 when the lining 29 and surface 30 are moved into engagement with each other. In the preferred embodiment the friction lining 29 is composed of an asbestos molded material.

Disposed between the housing 11 and the rotatable brake element 26 is a piston element 31. The piston 31 is a generally annular element supported by the axle 19 with one side generally in contact with a interior surface of the brake element 26 and the other side, together with a portion of the housing 11, forming an hydraulic brake chamber 32. The chamber 32 is in communication with an hydraulic fluid port or conduit 34 which, via appropriate fittings 35, is connected with a source of hydraulic fluid pressure (not shown). As will be discussed in greater detail below, the piston 31 and chamber 32, under appropriate hydraulic pressure conditions, function to move the rotatable brake element 26, and thus the lining 29, toward the left, or out of frictional engagement with the surface 30. A plurality of O-rings 36, 38 and 39, or other appropriate seals, are operatively associated with the piston 31 to retain pressurized hydraulic fluid within the chamber 32 and to prevent the leakage of such fluid from the chamber 32. A conventional O-ring 40 or other appropriate seal is also disposed between the brake cylinder housing 11 and the axle 19 to prevent leakage of pressurized hydraulic fluid into the chamber housing the bearing 20. The piston 31 is stationary except for limited longitudinal movement along the axle in response to hydraulic pressure in the chamber 32. The piston 31 does not, however, rotate with the axle 19 or the brake element 26. A suitable thrust bearing 41 is disposed between the stationary piston 31 and the rotating brake element 26.

Adjacent to and operatively engaged with the rotatable brake element 26 is a wheel hub 42 which is adapted for connection to and rotation with a wheel or other rotary member whose rotation is desired to be controlled. When connected to the wheel of a vehicle, the wheel rim 44 is generally connected directly to the wheel hub 42 by a plurality of hexagonal bolts 45 disposed near the periphery of the hub 42 as illustrated. The wheel hub 42 is rotatably supported on the axle 19 by a plurality of suitable bearings 46 and 48 and is retained in proper longitudinal position on the axle 19 by a lock ring 49.

Contained within a portion of the wheel hub 42 on its inner side and adjacent to the axle 19 is a stack of springs 50 which comprises an operative portion of the brake assembly. The stack of springs 50 has one end supported and retained by a portion of the hub 42 through an appropriate thrust bearing 51 and the other end disposed against the left hand side of the brake element 26. The spring stack 50 functions to continually bias the brake element 26 toward the right as viewed in FIGS. 2 and 3 or toward a friction engaging position between the lining 29 and the surface 30. Although a variety of springs may be used, in the preferred embodiment, the spring stack 50 includes a stack of expandable Belleville washers. When there is insufficient hydraulic pressure in the chamber 32, the spring 50 biases the element 26 and piston 31 toward the right of the position illustrated in FIG. 3. In this position, the lining 29 is in frictional braking engagement with the surface 30. When hydraulic fluid under sufficient pressure is introduced into the chamber 32, the piston 31 and thus the element 26 is moved toward the left to the position shown in FIG. 2. In this position, the lining 29 and surface 30 are disengaged and the element 26 and axle 19 are rendered freely rotatable.

The axle 19 is provided with lubrication passages 54, 52 and 55 which provide low pressure lubrication to the spring stack 50 and the bearings 41, 46, 48 and 51. Specifically, the passage 52 extends at right angles to the passage 54 and communicates with the chamber housing the thrust bearing 41 disposed between the piston 31 and the element 26. Similarly, the passage 55 communicates with the spring stack chamber and provides lubrication for the spring stack 50 and the bearings 46, 48 and 51. Appropriate O-rings or other seals 38, 58 and 59 are positioned to retain the lubrication fluid within the wheel brake assembly and to prevent the leakage of such lubricating fluid to undesired portions of the assembly.

Connected with the outside or left-hand surface of the wheel hub 42 is a metal plate member 60 which is connected with the wheel hub 42 by a plurality of screws 61. A conventional metal oil seal 47 having a rubber lip on its inner surface is disposed between an interior surface of the plate member 60 and the exterior surface of the axle 19 to further prevent leakage of lubricating fluid from the wheel brake assembly. It should be noted that unlike the rotating brake element 26 which is connected to the axle 19 for rotation therewith, the wheel hub 42 is freely rotatable relative to the axle 19.

Adjacent to the wheel hub 42 and positioned to the left of such hub as viewed in FIGS. 2 and 3 is a spring loaded free wheel hub 62 which comprises the means for selectively engaging and disengaging the axle 19 with the wheel hub 42. The free wheel hub 62 is a generally annular member which is splined with the axle 19 for a rotation therewith. The axially extending splines between the hub 62 and the axle 19 also permit limited axial movement of such hub 62 along the longitudinal axis of the axle 19 between a first position shown in FIG. 2 and a second position shown in FIG. 3. The hub 62 includes engaging means for selectively engaging the axle 19 with the wheel hub 42 to cause the hub 42 to rotate with the axle 19. Specifically, this means includes a plurality of shear pins axially disposed relative to the axle 19 which extend from the hub 62 and, under appropriate selective conditions, extend through the plate member 60 and into engagement with a portion of the wheel hub 42. When the free wheel hub 62 is in the position illustrated in FIG. 2, the shear pins 64 extend through the plate 60 and into the wheel hub 42 permitting rotating engagement between the hubs 42 and 62 and thus also between the axle 19 and the hub 42.

A steel compression spring or other bias means 64 is associated with the free wheel hub 62 to continually bias the hub 62 toward the left as viewed in FIGS. 2 and 3. As illustrated, one end of the spring 65 acts against the hub 62 while the other end acts against the oil seal 47. A conventional lock pin 66 extends through one of two holes 68 or 69 in the axle 19 to retain the free wheel hub 62 in the desired selected position. When the lock pin 66 is placed in the hole 69, the hub 62 is in the position illustrated in FIG. 2 in which the shear pins 64 are engaged with the wheel hub 42. In this position, the wheel hub 42, and thus the wheel or other rotary member to which the wheel hub is connected, rotates with the axle 19 as the result of such engagement between the hub 42 and shear pins 64. When the lock pin 66 is removed from hole 69 and placed in hole 68, the free wheel hub 62 is moved toward the left against the pin 66 as shown in FIG. 3. Such movement is caused by the compression spring 65 acting aganst the hub. 62. In this position, the shear pins 64 are disengaged from the hub 42 and the hub 42, together with the wheel or other rotary member to which it is connected, is permited to rotate freely about the axle 19, even though the lining 29 and surface 30 are in frictional engagement with each other as shown in FIG. 3. It should be noted that the spring 65 is only sufficiently strong to keep the free wheel hub 62 biased against the lock pin 66 when such pin 66 is in the hole 68.

Having described the structure of the wheel brake assembly of the present invention in detail, the operation of such wheel brake can be understood as follows: As illustrated in FIG. 1, the wheel brake assembly is adapted for connection with a rotatable wheel such as that of a vehicle, although the present assembly may be suitable for other purposes and for connection with other rotatable elements. As shown in FIG. 1, the wheel brake assembly 10 is connected with the frame 12 of the vehicle or other supporting apparatus by appropriate connection means. The wheel 13 through its rim 44 is then connected with the wheel hub 42 by a plurality of conventional bolts 45. In the present embodiment, the assembly is powered by an hydraulic motor 14 which is connected with a suitable source of hydraulic fluid pressure (not shown). During normal operation the free wheel hub 62 assumes the position illustrated in FIG. 2, with the shear pins 64 engaged with the wheel hub 42. In this position, the wheel hub 42, and thus the wheel 13 (FIG. 1), rotates with the axle 19. If the pressure of hydraulic fluid in the chamber 32 is sufficient to overcome the spring force 50, the braking surfaces 29 and 30 will be out of engagement, thus permitting rotation of the axle 19. It not, the spring 50 will force the braking element 26 toward the right and the surfaces 29 and 30 into frictional engagement, preventing rotation of the axle 19 and thus the wheel and wheel hub 42. In the present embodiment, the inventor utilizes a spring stack 50 which exerts a force on the rotatable brake element 26 which is overcome by a pressure of approximately 175 p.s.i. Thus, when the system is operational and at least 175 p.s.i. of pressure is applied to the chamber 32, the brake element 26 will be in the position illustrated in FIG. 2 with the frictional lining 29 disengaged from the inverted conical surface 30. When the pressure in the chamber 32 falls below 175 p.s.i. or the force exerted by the spring 50, such as when the system is not operating or when there is a failure in the hydraulic pressure system, the spring stack 50 will act against the brake element 26 causing movement of such element toward the right and frictional braking engagement between the friction lining 29 and the surface 30.

Many times, however, when there has been an hydraulic pressure failure or some other factor preventing fluid pressure from being communicated to the chamber 32, it is desired to tow the vehicle or to otherwise rotate the rotatable member. Normally, this cannot be accomplished since the spring stack 50 is biasing the element 26 and thus the lining 29 into braking engagement with the surface 30. The present assembly, however, provides means for rendering the wheel hub free wheeling under such circumstances. If the vehicle is desired to be towed while there is an absence of hydraulic fluid pressure in the chamber 32, the lock pin 66 is removed from hole 69 and placed into the hole 68 permitting the free wheel hub 62 to move to its outer position as illustrated in FIG. 3. In this position, the shear pins 64 are disengaged from the wheel hub 42, thereby permitting the wheel hub 42 and the wheel which is connected therewith to rotate freely about the axle 19. This arrangement permits the vehicle to be towed or the rotating member to be rotated even though there is an absence of pressure in the chamber 32 and even though the frictional lining 29 and surface 30 are frictional, braking engagement.

Although the description of the structure and operation of the wheel brake assembly of the present invention has been quite specific, it is intended that such description be considered as illustrative only, recognizing that various changes or modifications could be made to the structure described above without deviating from the spirit of the present invention. Therefore, it is intended that the scope of the present invention be dictated by the appended claims rather than by the description of the preferred embodiment.

We claim:

1. A combination wheel brake assembly for connection with a rotatable vehicle wheel comprising:
   a rotatable axle;
   a spring applied, hydraulically released brake assembly including a rotatable brake element rotatable with said axle and a non-rotatable brake element, one of said brake elements being axially movable longitudinally along said axle into frictional engagement with the other to effect braking of said axle;
   a wheel hub adjacent to and operatively engaged with said brake assembly and adapted for connection to said wheel and rotatably supported by said axle independently of said brake assembly; and
   means for selectively engaging and disengaging said axle and said wheel hub such that when engaged, said wheel hub rotates with said axle, and when disengaged, said wheel hub is freely rotatable relative to said axle and relative to said rotatable brake element.

2. The wheel brake assembly of claim 1 wherein said means for selectively engaging and disengaging said axle and wheel hub includes a free wheel hub member mounted on said axle for rotation therewith.

3. The wheel brake assembly of claim 2 wherein said free wheel hub member includes engaging means for selectively engaging said wheel hub.

4. The wheel brake assembly of claim 1 wherein said rotatable brake element includes a cone-shaped braking surface.

5. The wheel brake assembly of claim 1 comprising, in combination, an hydraulic motor for rotating said axle.

6. A combination wheel brake assembly for connection with a rotatable wheel comprising:
   a rotatable axle;
   a spring applied, hydraulically released brake assembly including a rotatable brake element rotatable with said axle and a non-rotatable brake element, one of said brake elements being axially movable into frictional engagement with the other to effect braking of said axle;
   a wheel hub adjacent to said operatively engaged with said brake assembly and adapted for connection to said wheel and rotatably supported by said axle independently of said brake assembly; and
   means for selectively engaging and disengaging said axle and said wheel hub such that when engaged, said wheel hub rotates with said axle, and when disengaged, said wheel hub is freely rotatable relative to said axle and relative to said rotatable brake element, said means including a free wheel hub member mounted on said axle for rotation therewith wherein said free wheel hub member includes engaging means for selectively engaging said wheel hub and is axially movable along said axle between a first position in which said engaging means is in engagement with said wheel hub and a second position in which said engaging means is disengaged from said wheel hub.

7. The wheel brake assembly of claim 6 wherein said engaging means includes a plurality of shear pins.

8. The wheel brake assembly of claim 7 wherein said shear pins are axially disposed relative to said axle and axially movable into engagement with said wheel hub.

9. A combination wheel brake assembly for connection with a rotatable wheel comprising:
   a rotatable axle;
   a spring applied, hydraulically released brake assembly including a rotatable brake element rotatable with said axle and a non-rotatable brake element, one of said brake elements being axially movable into frictional engagement with the other to effect braking of said axle;
   a wheel hub adapted for connection to said wheel and rotatably supported by said axle;
   means for selectively engaging and disengaging said axle and said wheel hub such that when engaged, said wheel hub rotates with said axle, and when disengaged, said wheel hub is freely rotatably relative to said axle and said rotatable brake element, said means including a free wheel hub member mounted on said axle for rotation therewith wherein said free wheel hub member includes a plurality of shear pins axially disposed relative to said axle and axially movable into engagement with said wheel hub for selectively engaging said wheel hub and wherein said free wheel hub member is axially movable along said axle between a first position in which said engaging means is in engagement with said wheel hub and a second position in which said engaging means is disengaged from said wheel hub; and
   bias means for biasing said free wheel hub member out of engagement with said wheel hub.

10. The wheel brake assembly of claim 9 wherein said bias mean is a compression spring.

11. The wheel brake assembly of claim 9 having means for securing said free wheel hub member in said first and second positions.

12. The wheel brake assembly of claim 11 wherein said means for securing said free wheel hub member in said first and second positions includes said bias means and a locking pin extending through said axle.